United States Patent
Kasuga et al.

(10) Patent No.: US 8,696,342 B2
(45) Date of Patent: Apr. 15, 2014

(54) WAVEFORM MONITOR APPARATUS OF INJECTION MOLDING MACHINE

(75) Inventors: Nobukazu Kasuga, Nagano-ken (JP);
Hirofumi Murata, Nagano-ken (JP);
Takashi Hakoda, Nagano-ken (JP);
Osamu Ichikawa, Nagano-ken (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 68 days.

(21) Appl. No.: 13/554,259

(22) Filed: Jul. 20, 2012

(65) Prior Publication Data
US 2013/0022698 A1    Jan. 24, 2013

(30) Foreign Application Priority Data
Jul. 21, 2011    (JP) .................................. 2011-160083

(51) Int. Cl.
*B29C 45/77*    (2006.01)
*B29C 45/78*    (2006.01)

(52) U.S. Cl.
USPC .......................................... 425/149; 425/150

(58) Field of Classification Search
CPC ................................. B29C 45/77; B29C 45/78
USPC .......................................... 425/149, 150, 171
See application file for complete search history.

(56) References Cited

U.S. PATENT DOCUMENTS

| 6,258,303 | B1 * | 7/2001 | Hibi et al. ..................... 264/40.5 |
| 6,848,895 | B2 * | 2/2005 | Konishi et al. ................ 425/130 |
| 2003/0082255 | A1 * | 5/2003 | Konishi et al. ................ 425/171 |
| 2011/0223274 | A1 * | 9/2011 | Enomoto et al. .............. 425/150 |
| 2012/0306112 | A1 * | 12/2012 | Tokuyama et al. ........... 264/40.5 |

FOREIGN PATENT DOCUMENTS

| JP | 2001-260174 A | 9/2001 |
| JP | 2004-330479 A | 11/2004 |
| JP | 2007-118349 A | 5/2007 |

* cited by examiner

*Primary Examiner* — Tim Heitbrink
(74) *Attorney, Agent, or Firm* — Birch, Stewart, Kolasch & Birch, LLP

(57) ABSTRACT

When a waveform monitor apparatus 1 of an injection molding machine M for monitoring an operation waveform at least during molding is configured by mounting the waveform monitor apparatus 1 on the injection molding machine M for performing molding according to a specific molding system, a parting opening detecting means Fp for detecting change data of a parting opening Lm to a time during molding, and an operation waveform displaying means Fd for displaying at least change data from a resin filling start is into a mold 2 to a cooling time termination to of the mold 2, detected by the parting opening detecting means Fp, on a waveform displaying portion 5 of a screen 4v on a display 4 attached to a molding machine controller 3 are provided.

14 Claims, 8 Drawing Sheets

| MOLD CLAMPING FORCE [kN] | MOLDING CLEARANCE [mm] | RESIDUAL CLEARANCE [mm] | BURR | SHRINKAGE | WARPAGE | DEGASSING | |
|---|---|---|---|---|---|---|---|
| 40 | 0 | 0 | ◎ | ▲▲ | ▲ | ▲ | |
| 35 | 0 | 0 | ◎ | ▲▲ | ▲ | ▲ | |
| 30 | 0 | 0 | ◎ | ▲▲ | ▲ | △ | |
| 25 | 0.01 | 0 | ◎ | ▲ | △ | △ | |
| 20 | 0.02 | 0 | ◎ | △ | △ | ◎ | |
| 18 | 0.03 | 0 | ◎ | ◎ | ◎ | ◎ | Zu |
| 16 | 0.1 | 0.01 | ◎ | ◎ | ◎ | ◎ | |
| 15 | 0.15 | 0.02 | ◎ | ◎ | ◎ | ◎ | |
| 14 | 0.17 | 0.03 | ◎ | ◎ | ◎ | ◎ | |
| 13 | 0.2 | 0.04 | ○ | ◎ | ◎ | ◎ | |
| 12 | 0.3 | 0.1 | △ | ◎ | ◎ | ◎ | |
| 11 | 0.4 | 0.3 | ▲ | ◎ | ◎ | ◎ | Zus |
| 10 | 0.5 | 0.4 | ▲▲ | ◎ | ◎ | ◎ | |

WAVEFORM MONITOR APPARATUS OF INJECTION MOLDING MACHINE

TECHNICAL FIELD

The present invention relates to a waveform monitor apparatus of an injection molding machine which is mounted on an injection molding machine for performing molding according to a specific molding system, for monitoring an operation waveform at least during molding.

BACKGROUND ART

Conventionally, in an ordinary injection molding method except for a molding method basically different in molding principle therefrom, such as an injection compression molding method, it is a common molding method to apply a high-pressure mold clamping force to a mold to perform mold clamping. However, energy saving or the like is demanded in an industrial machine such as an injection molding machine in view of global environmental protection such as reduction of carbon dioxide emission and resource reduction.

In view of these circumstances, the present applicant already proposed an injection molding method having such a merit that the demand for energy saving from the viewpoint of the global environmental protection such as reduction of carbon dioxide emission and resource reduction was satisfied by performing pressure application to a mold only at a required time by a required amount and degassing within the mold could be performed reliably and stably during molding in Patent Literature 1. In the injection molding method, when injection molding is performed by injecting and filling molten resin from an injecting apparatus into a mold supported by a mold opening and closing apparatus and composed of a fixed mold and a movable mold, a clearance (set distance) between the fixed mold and the movable mold, into which the molten resin does not enter, is set in advance and the mold is closed in a state where the clearance based on the set distance is provided during molding, so that the molten resin is injected and filled into the mold from the injection apparatus. Position control to the movable mold is also performed so as to fix the set distance at least during injecting and filling.

On one hand, when molding is performed by the conventional injection molding machine (molding method), since the mold clamping apparatus is provided with a function of performing mold clamping to the mold, it is put in a so-called static environment where movement hardly occurs, and since the injection apparatus is provided with a function of injecting and filling molten resin into the mold, it is put in a so-called movable environment where movement occurs. Therefore, like the display apparatus for injection molding disclosed in Patent Literature 2, the monitor display method disclosed in Patent Literature 3, or the like, there is such an actual circumstance that the majority of operation waveforms monitored during molding are operation waveforms (physical qualities) on the side of the injection apparatus, such as injection pressures, injection speeds, pressure-holding forces, and the like at an injection step and a pressure-holding step, whilst monitoring of operation waveforms (physical quantities) on the side of the mold clamping apparatus is hardly conducted.

SUMMARY OF INVENTION

Technical Problem

Therefore, the waveform monitor apparatus (the display apparatus and the monitor display method) for monitoring an operation waveform in the above-described conventional injection molding machine has the following problems.

First, when a waveform monitor apparatus for monitoring an operation waveform is generally configured, it is configured so as to correspond to a molding system in an injection molding machine. Thus, there is a possibility that the waveform monitor apparatus is not compatible when another specific molding system different from the corresponding molding system is adopted. In particular, since the conventional waveform monitor apparatus hardly monitors operation waveforms on the side of the mold clamping apparatus, even if important monitoring items relating to the molding are present on the side of the mold clamping apparatus, it becomes difficult to respond to these items. Eventually, monitoring during production becomes insufficient, the insufficient monitoring constitutes a blocking factor which is not negligible in order to achieve improvement in molding quality, production yield and the like in a case of adoption of a different molding system or the like, and the monitoring becomes insufficient even from the viewpoint of general versatility and expandability.

Secondly, since the waveform monitor apparatus of this type is usually used to monitor whether or not an abnormal value or abnormal fluctuation occurs in a physical quality such as an injection speed or an injection pressure during molding (during production), a monitor screen for performing monitoring during molding and a setting screen for performing settings of molding conditions or the like in advance are separated from each other. Therefore, the monitor screen and the setting screen are individually displayed by performing switching therebetween through a screen selector key. As a result, when a different specific molding system is adopted and setting (adjusting) of the molding conditions is performed utilizing both the monitor screen and the setting screen, it cannot be necessarily said that the waveform monitor apparatus is sufficient for improving ease and accuracy of setting and achieving optimization, which results in existence of a room for further improvement.

Solution to Problem

In order to solve the above-described problems, in a configuration of a waveform monitor apparatus 1 of an injection molding machine M for monitoring an operation waveform at least during molding, which is mounted on the injection molding machine M which performs molding according to a specific molding system where a predetermined clearance (a parting opening) Lm occurs between a movable mold 2m and a fixed mold 2c in a mold 2 at an injecting and filling time and an injection pressure (hereinafter called, molding injection pressure) Pi and a mold clamping force (hereinafter, called molding mold clamping force) Pc which can mold a good product are obtained and set, a mold clamping apparatus Mc is mold-clamped by the molding mold clamping force Pc, and resin R is injected and filled into the mold 2 by driving an injection apparatus Mi where the molding injection pressure Pi has been set as a limit pressure Ps, wherein the present invention is characterized in that a parting opening detecting means Fp for detecting change data of the parting opening Lm to a time during molding, and an operation waveform displaying means Fd for displaying at least change data from resin filling start ts into the mold 2 to a cooling time termination te of the mold 2, detected by the parting opening detecting means Fp on a waveform displaying portion 5 on a screen 4v of a display 4 attached to a molding machine controller 3 are provided.

Advantageous Effects of Invention

According to the waveform monitor apparatus 1 of the injection molding machine M according to the present invention obtained by the above approach, the following noticeable effects can be obtained.

(1) The parting opening detecting means Fp for detecting change data of the parting opening Lm to a time during molding, and the operation waveform displaying means Fd for displaying at least change data from resin filling start ts into the mold 2 to a cooling time termination te of the mold 2, detected by the parting opening detecting means Fp, on the waveform displaying portion 5 on the screen 4v of the display 4 attached to the molding machine controller 3 are provided. Therefore, even if the waveform monitor apparatus is mounted on an injection molding machine M which performs molding according to a specific molding system, namely, the molding system where a predetermined parting opening Lm occurs between the movable mold 2m and the fixed mold 2c in the mold 2 at an injecting and filling time and the molding injection pressure Pi and the molding mold clamping force Pc which can mold a good product are obtained and set, the mold clamping apparatus Mc is mold-clamped by the molding mold clamping force Pc, and resin R is injected and filled into the mold 2 by driving an injection apparatus Mi where the molding injection pressure Pi is set as a limit pressure Ps, the change situation of the parting opening Lm of the mold 2, which is an operation waveform on the side of the mold clamping apparatus Mc can be visually monitored easily and effectively. Accordingly, even in the injection molding machine M which performs molding according to the specific molding system, sufficient monitoring can be performed during production, improvement in molding quality, production yield and the like can be realized, and contribution to general versatility and expandability can be achieved.

(2) According to a preferred aspect, when a position detector 11 which is attached to the mold 2 to detect a relative position between the movable mold 2m and the fixed mold 2c is used as the parting opening detecting means Fp, the size of the parting opening Lm can be directly detected, so that an accurate parting opening Lm from which error factors other than the position detector 11 is excluded as much as possible, and further change data thereof can be obtained.

(3) According to a preferred aspect, when the operation waveform displaying means Fd is provided with a superimposition displaying function Fdp which superimposes the change data of the injection pressure Pd to a time during molding on the change data of the parting opening Lm to perform displaying on the waveform displaying portion 5, the change of the parting opening Lm to a time can be grasped in contrast with the change of the injection pressure Pd to a time, so that the change data of the parting opening Lm can be monitored more accurately, and fine adjustment of the like for optimizing the molding condition can be performed easily.

(4) According to a preferred aspect, when the operation waveform displaying means Fd is provided with a superimposition displaying function Fdv which superimposes the change data of the injection speed Vd to a time during molding on the change data of the parting opening Lm to perform displaying on the waveform displaying portion 5, the change of the parting opening Lm to a time can be grasped in contrast with the change of the injection speed Vd to a time, so that the change data of the parting opening Lm can be monitored more accurately, and fine adjustment of the like for optimizing the molding condition can be performed easily.

(5) According to a preferred aspect, when the operation waveform displaying means Fd is provided with a partially-enlarging displaying function Fde which can designate any partial section on a time axis (horizontal axis) on the waveform displaying portion 5 to display the partial section in an enlarged fashion, any partial section on a waveform can be displayed in an enlarged fashion. Therefore, for example, an important region can be confirmed more precisely by enlarging the vicinity of the maximum of the parting opening Lm, and the condition setting (changing) regarding injection and the condition setting (changing) regarding the mold clamping force can be performed easily.

(6) According to a preferred aspect, when the operation waveform displaying means Fd is provided with a mold clamping force setting portion 12 which is arranged adjacent to the waveform displaying portion 5 and sets at least the mold clamping force Pc, while a waveform (change) of the parting opening Lm displayed on the waveform displaying portion 5 is confirmed, setting can be performed using the mold clamping force setting portion 12, so that setting of the mold clamping force Pc which largely affects the change of the parting opening Lm can be performed more precisely.

(7) According to a preferred aspect, when the operation waveform displaying means Fd is provided with an analog displaying portion 13 which is arranged adjacent to the waveform displaying portion 5 and is attached with a scale 14 which can display the parting opening Lm obtained in real time in an analog fashion, the change condition of the parting opening Lm to a time displayed on the waveform displaying portion 5 and a numerical value (size) of the parting opening Lm displayed on the analog displaying portion 13 in real time can be confirmed simultaneously, so that optimal monitoring of the parting opening Lm can be realized according to a synergistic effect based on both the change condition and the numerical value.

(8) According to a preferred aspect, when a switchable configuration between the above-described specific molding system and a general-purpose molding system where mold clamping of the mold 2 is performed by a set predetermined mold clamping force and molding is performed by injecting and filling resin into the mold 2 at a set predetermined injection speed and with a set predetermined injection pressure is adopted and the operation waveform displaying means Fd is used only in a switched state to the specific molding system, optimization of the specific molding system is made possible without sacrificing the general-purpose molding system, so that selection from molding systems matching with various molding scenes different in kind of a molded product, kind of molding material or the like is made possible, multi-functionality and further commodity value and merchantability of the injection molding machine M are enhanced, and usability on a user side can be further enhanced.

DESCRIPTION OF EMBODIMENTS

Next, a best mode embodiment of the present invention will be described in detail with reference to the drawings. Incidentally, the accompanying drawings are not for specifying the present invention but for facilitating understanding of the present invention. Further, detailed explanation of well-known parts is omitted in order to avoid obscuration of the invention.

First, a configuration of an injection molding machine M equipped with a waveform monitor apparatus 1 according to the embodiment will be described with reference to FIG. 1 to FIG. 5.

Figure 4:
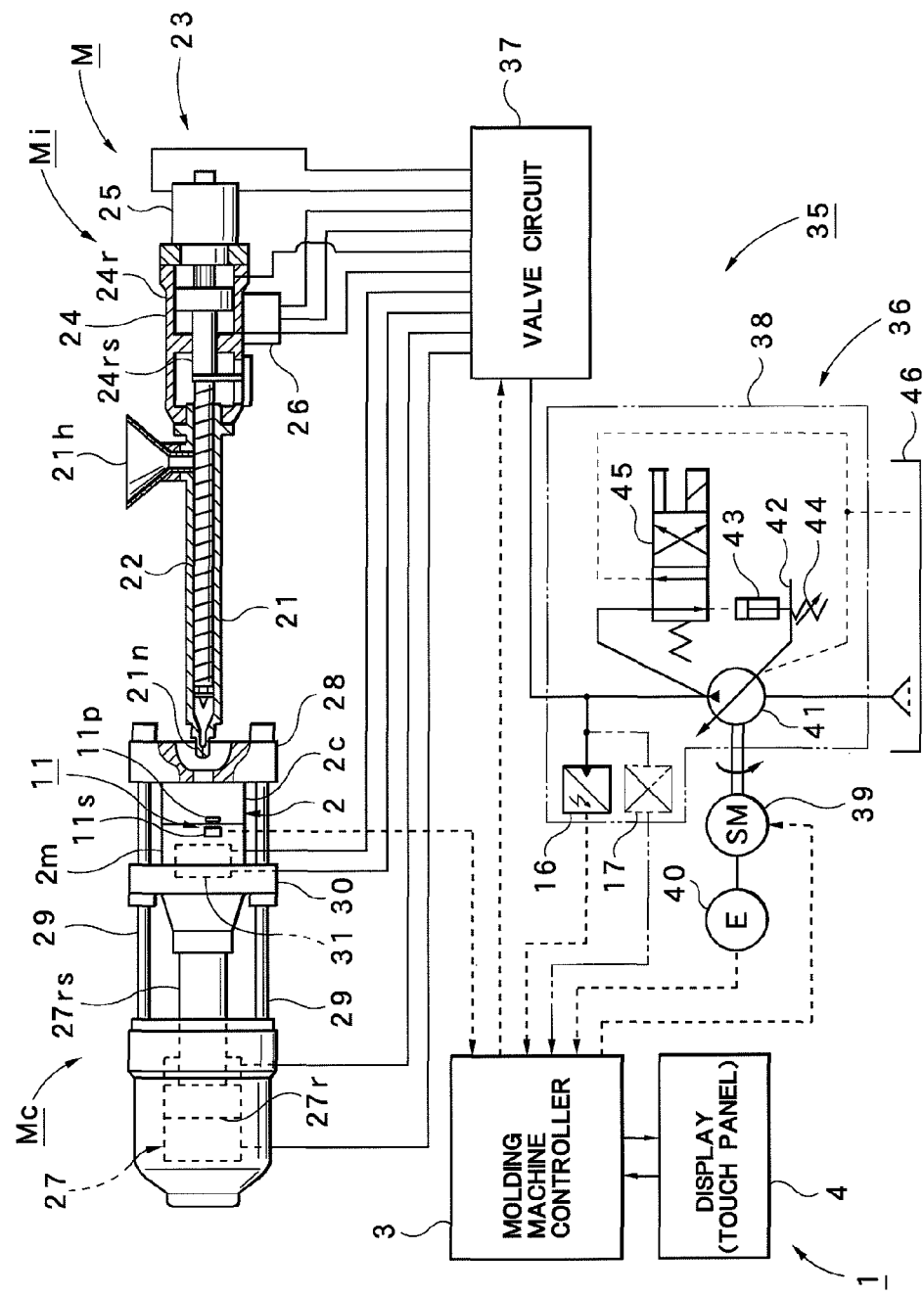
FIG. 4 is a configuration diagram of an injection molding machine equipped with the waveform monitor apparatus.
Figure 10:
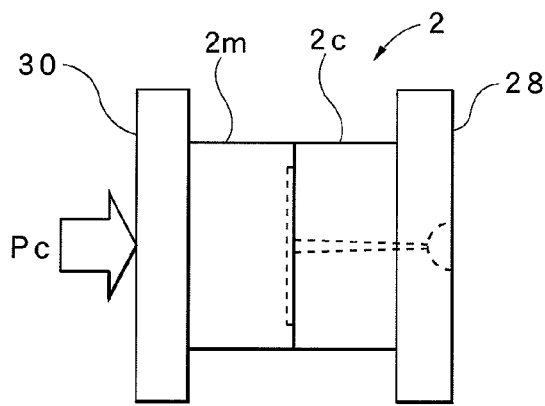
FIG. 10(a) is an illustrative diagram showing a state of a mold in the injection molding machine.
FIG. 10(b) is an illustrative diagram showing another state of the mold in the injection molding machine.
FIG. 10(c) is an illustrative diagram showing still another state of the mold in the injection molding machine.
Figure 10:
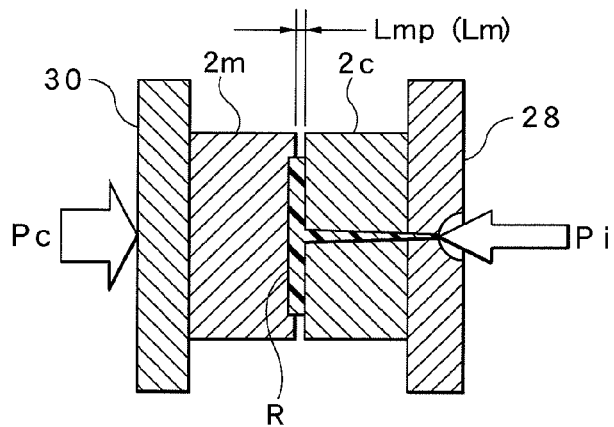
Figure 10:
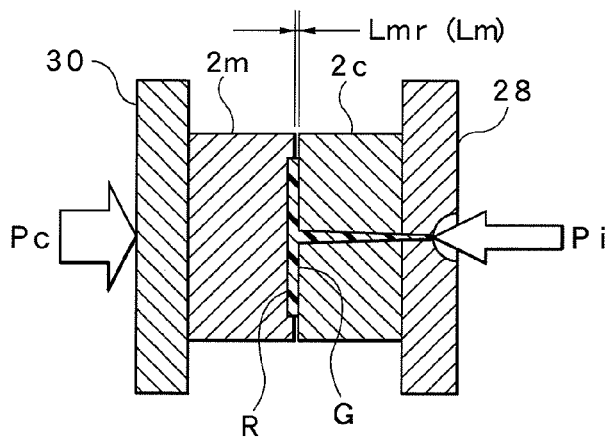

In FIG. 4, reference sign M denotes an injection molding machine, which is provided with an injection apparatus Mi and a mold clamping apparatus Mc. The injection apparatus Mi is provided with a heating cylinder 21 having an injection nozzle 21n at a front end thereof and a hopper 21h at a rear portion thereof, respectively, and a screw 22 is inserted inside the heating cylinder 21 and a screw driving portion 23 is arranged at a rear end of the heating cylinder 21. The screw driving portion 23 is provided with an injection cylinder (a hydraulic pressure cylinder) 24 incorporating an injection ram 24r of a one-side rod type therein, and a ram rod 24rs of the injection cylinder 24 projecting forward is coupled to a rear end of the screw 22. Further, a shaft of a metering motor (oil motor) 25 attached to the injection cylinder 24 is splined to a rear end of the injection ram 24r. Reference sign 26 is an injection apparatus moving cylinder which moves the injection apparatus Mi forward and backward to perform nozzle touch to the mold 2 and release the nozzle touch. Thereby, the injection apparatus Mi can cause the injection nozzle 21n to touch the mold 2 to inject and fill molten (plasticized) resin R (FIG. 10(b)) into a cavity in the mold 2.

On one hand, as the mold clamping apparatus Mc, a hydraulic pressure type mold clamping apparatus of a direct pressure system which displaces a movable mold 2m by a driving ram 27r of a mold clamping cylinder (hydraulic pressure cylinder) 27. Using such a hydraulic pressure type mold clamping apparatus as the mold clamping apparatus Mc is optimal in a case that a required clearance (parting opening) Lm (Lmp, Lmr) is caused to occur by displacing the movable mold 2m by an injection pressure at an injecting and filling time. The mold clamping apparatus Mc has a movable plate 30 which is slidably attached to a plurality of die bars 29 . . . provided to bridge between a fixed plate 28 and the mold clamping cylinder 27 which are fixed to their positions and are spaced apart from each other. A distal end of a ram rod 27rs projecting forward from the mold clamping cylinder 27 is fixed to the movable plate 30. Further, the fixed mold 2c is attached to the fixed plate 28, while the movable mold 2m is attached to the movable plate 30. The fixed mold 2c and the movable mold 2m constitute the mold 2. Therefore, the mold clamping cylinder 27 can perform mold opening and closing and mold clamping to the mold 2. Incidentally, reference sign 31 denotes a pushing-out cylinder which performs pushing-out of a molded product G (FIG. 10(c)) which has adhered to the movable mold 2m when the mold 2 is opened.

On the other hand, reference sign 35 denotes a hydraulic circuit, which is provided with a variable delivery hydraulic pump 36 serving as a hydraulic driving source and a valve circuit 37. The hydraulic pump 36 is provided with a pump portion 38 and a servo motor 39 rotationally driving the pump portion 38. Reference sign 40 denotes a rotary encoder which detects the number of rotations of the servo motor 39. Further, the pump portion 38 incorporates a pump machine body 41 composed of a swash plate piston pump therein. Therefore, the pump portion 38 is provided with a swash plate 42, and when an inclination angle (swash plate angle) of the swash plate 42 is made large, a stroke of the pump piston in the pump machine body 41 become large, so that a delivery flow rate increases, while when the swash plate angle is made small, the stroke of the pump piston becomes small, so that a delivery flow rate decreases. Therefore, by setting the swash plate angle to a predetermined angle, a fixed delivery flow rate where the delivery flow rate (maximum capacity) is fixed to a predetermined value can be set. The swash plate 42 is attached with a control cylinder 43 and a return spring 44, while the control cylinder 43 is connected to a delivery port of the pump portion 38 (pump machine body 41) via a selector valve (solenoid valve) 45. Thereby, the angle (swash plate angle) of the swash plate 42 can be changed by controlling the control cylinder 43.

Further, an inlet port of the pump portion 38 is connected to an oil tank 46, while a delivery port of the pump portion 38 is connected to a primary side of the valve circuit 37, and a secondary side of the valve circuit 37 is further connected to the injection cylinder 24, the metering motor 25, the mold clamping cylinder 27, the pushing-out cylinder 31, and the injection apparatus moving cylinder 26. Therefore, the valve circuit 37 is provided with selector valves (solenoid valves) connected to the injection cylinder 24, the metering motor 25, the mold clamping cylinder 27, the pushing-out cylinder 31, and the injection apparatus moving cylinder 26, respectively. The selector valves are each composed of necessary attached hydraulic parts including one, two or more valve parts, and have selector functions relating to supply, stop, and discharge of hydraulic oil to the injection cylinder 24, the metering motor 25, the mold clamping cylinder 27, the pushing-out cylinder 31, and the injection apparatus moving cylinder 26.

Accordingly, the delivery flow rate and delivery pressure of the variable delivery hydraulic pump 36 can be made variable by variably controlling the number of rotations of the servo motor 39, and driving controls to the above-described injection cylinder 24, metering motor 25, mold clamping cylinder 27, pushing-out cylinder 31, and injection apparatus moving cylinder 26 can be performed based on the variable control while controls of respective operation steps in a molding cycle can be performed. When the variable delivery hydraulic pump 36 where the fixed delivery flow rate can be set by changing the swash plate is used in this manner, the pump capacity can be set to a fixed delivery flow rate with a predetermined capacity (maximum capacity). Also, since the delivery flow rate and the delivery pressure can be made variable based on the fixed delivery flow rate, controls according to the control system can be implemented easily and smoothly.

Figure 5:
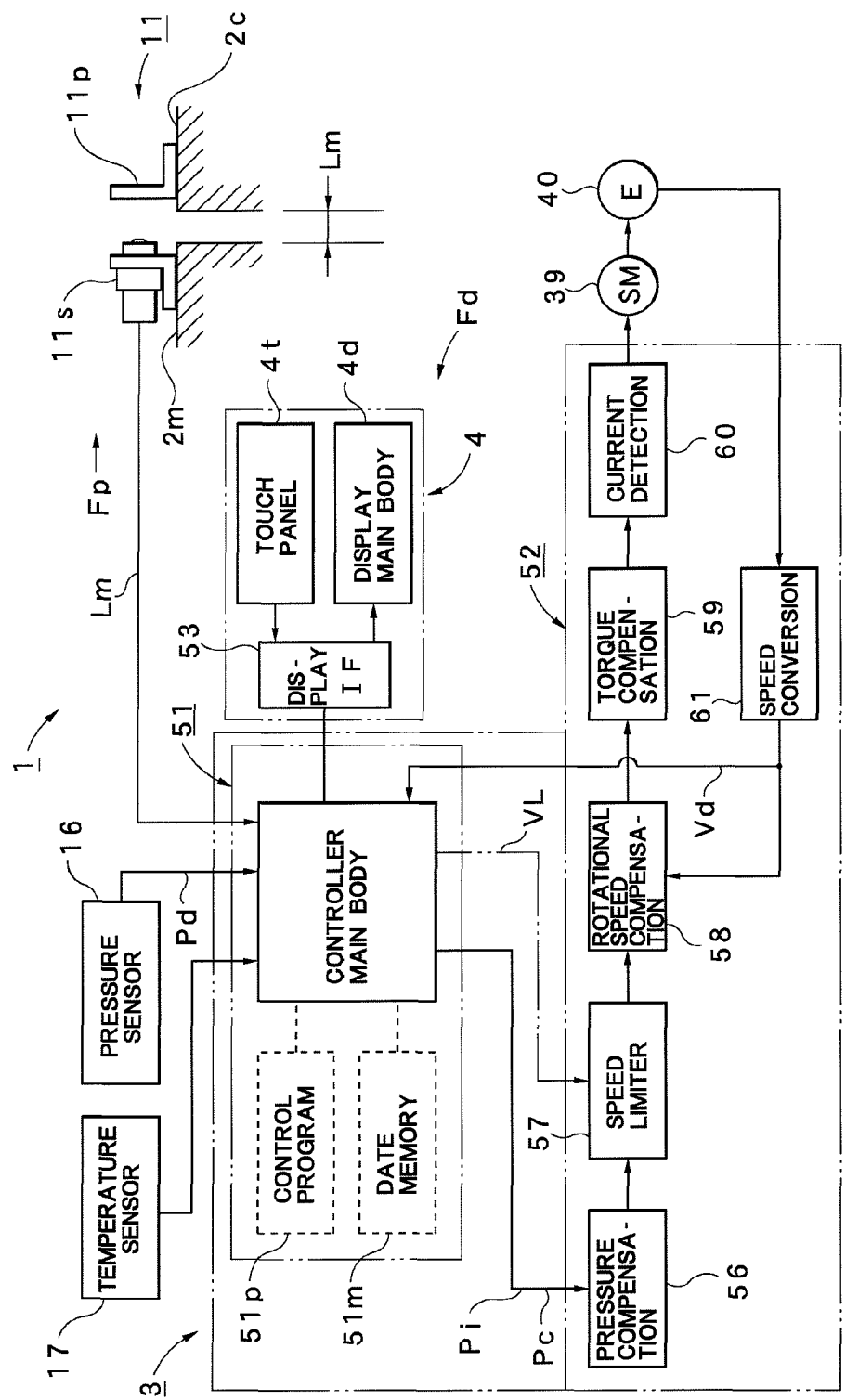
FIG. 5 is a block system diagram of a control system in a main section of the injection molding machine.

On one hand, reference sign 3 denotes a molding machine controller constituting a main section of the control system, and attached with a display 4. As shown in FIG. 5, the molding machine controller 3 incorporates a servo amplifier 52 therein, and the above-described servo motor 39 is connected to an output portion of the servo amplifier 52 while the rotary encoder 40 is connected to an encoder pulse input portion of the servo amplifier 52. Further, as shown in FIG. 4, the above-described valve circuit 37 is connected to a control signal output port of the molding machine controller 3.

On the other hand, a position detector (clearance sensor) 11 is attached to an outer face of the mold 2. The position detector 11 has a function of detecting a relative position between the movable mold 2m and the fixed mold 2c, namely, the size of the parting opening Lm. As shown in FIG. 5, for example, the position detector 11 can be composed of a combination of a reflecting plate 11p attached to the fixed mold 2c (or the movable mold 2m) and a reflecting type ranging sensor 11s which is attached to the movable mold 2m (or the fixed mold 2c) to emit light or electric wave to the reflecting plate 11p and perform ranging. At this time, it is desirable that when the position detector 11 is provided on an upper face of the mold 2, it is disposed in the vicinity of the center in a horizontal direction, and when the position detector 11 is provided on a side face of the mold 2, it is disposed in the vicinity of the center in a vertical direction. The position detector 11 constitutes the parting opening detecting means Fp for detecting change data of the parting opening Lm to a time during molding in the waveform monitor apparatus 1 according to the embodiment. If the position detector 11 which detects the relative position between the movable mold 2m and the fixed mold 2c is attached to the mold 2 as the parting opening detecting means Fp in this manner, the size of the parting opening Lm can be detected directly, so that such a merit can be obtained that a correct parting opening Lm where error factors other than the position detector 11 have been excluded as much as possible, as well as further change data thereof can be obtained. Further, a pressure sensor 16 which detects hydraulic pressure and a temperature sensor 17 which detects oil temperature are attached to the primary side of the valve circuit 37 in the hydraulic circuit 35. Then, the position detector 11, the pressure sensor 16 and the temperature sensor 17 are connected to sensor ports of the molding machine controller 3.

Further, in FIG. 5, a block system of the molding machine controller 3 (control system) is shown. The molding machine controller 3 includes a controller main body 51 and a servo amplifier 52 therein. The controller main body 51 has a computer function incorporating therein a hardware including a CPU, an internal memory, and the like. Therefore, the internal memory stores, therein, a control program (software) 51p for executing various calculation processing and various control processing (sequence control), and includes a data memory 51m which can store various data (database) and the like therein. In particular, the control program 51p includes a control program for causing the waveform monitor apparatus 1 according to this embodiment to function therein.

Further, since the injection molding machine M performs a molding operation according to the specific molding system (specific molding mode), the internal memory includes a control program (sequence control program) for performing the molding operation therein. In this case, the specific molding mode means a molding mode where a predetermined clearance, namely, the parting opening Lm preliminarily occurs between the movable mold 2m and the fixed mold 2c in the mold 2 at an injecting and filling time, a molding injection pressure Pi and a molding mold clamping force Pc which can mold a good product are obtained and set and the mold clamping apparatus Mc is clamped by the molding mold clamping force Pc during molding (during production), the injection apparatus Mi where the molding injection pressure Pi has been set as the limit pressure Ps is driven to inject and fill resin R into the mold 2, and after the injecting and filling, a molded product is taken out when a predetermined cooling time Tc elapses in the mold 2. The waveform monitor apparatus 1 according to this embodiment performs monitoring corresponding to this specific molding mode, and the specific molding mode will be described later in detail. On the other hand, the injection molding machine M also includes a control program (sequence control program) for performing a molding operation according to a general-purpose molding system (general-purpose molding mode) which is conventionally implemented broadly. The general-purpose molding mode is a generally known molding mode of performing mold clamping to the mold 2 by a set predetermined mold clamping force and injecting and filling resin R into the mold 2 at a set predetermined injection speed with a predetermined injection pressure.

On the other hand, the display 4 is provided with a display main body 4d and a touch panel 4t attached to the display main body 4d, and the display main body 4d and the touch panel 4t are connected to the controller main body 51 via a displaying interface 53. Therefore, various setting operations, selecting operations, and the like can be performed by the touch panel 4t. A screen 4v shown in FIG. 1 relating to the waveform monitor apparatus 1 according to this embodiment is displayed on the display panel 4. The screen 4v is an injecting and metering screen. In this case, a plurality of screen selector keys K1, K2 . . . for performing switching among screens is displayed on top and bottom of the injecting and metering screen 4v. The screen selector keys K1 . . . are ranked considering level of frequency of use, where a "mold opening and closing screen" selector key K1, an "ejector screen" selector key K2, an "injecting and metering screen" selector key K3 displaying the injecting and metering screen 4v shown in FIG. 1, a "temperature screen" selector key K4, a "monitor screen" selector key K5, a "main condition screen" selector key K6, and a "condition selector screen" selector key K7 constituting a first group Ga relating to setting of the operation conditions of the molding machine are arranged along a horizontal line at the top, while a "operation switch screen" selector key K8, a "step monitoring screen" selector key K9, a "production information screen" selector key K10, a "waveform screen" selector key K11, a "history screen" selector key K12, and a "support screen" selector key K13 other than the above keys constituting a second group Gb are arranged along a horizontal line on the bottom. The respective selector keys K1 . . . are displayed on the same positions with the same shapes even if the injecting and metering screen 4V has been switched to another screen such as the mold opening and closing screen. Reference sign Kc denotes a selector key for performing switching to a second hierarchy screen.

Figure 1:
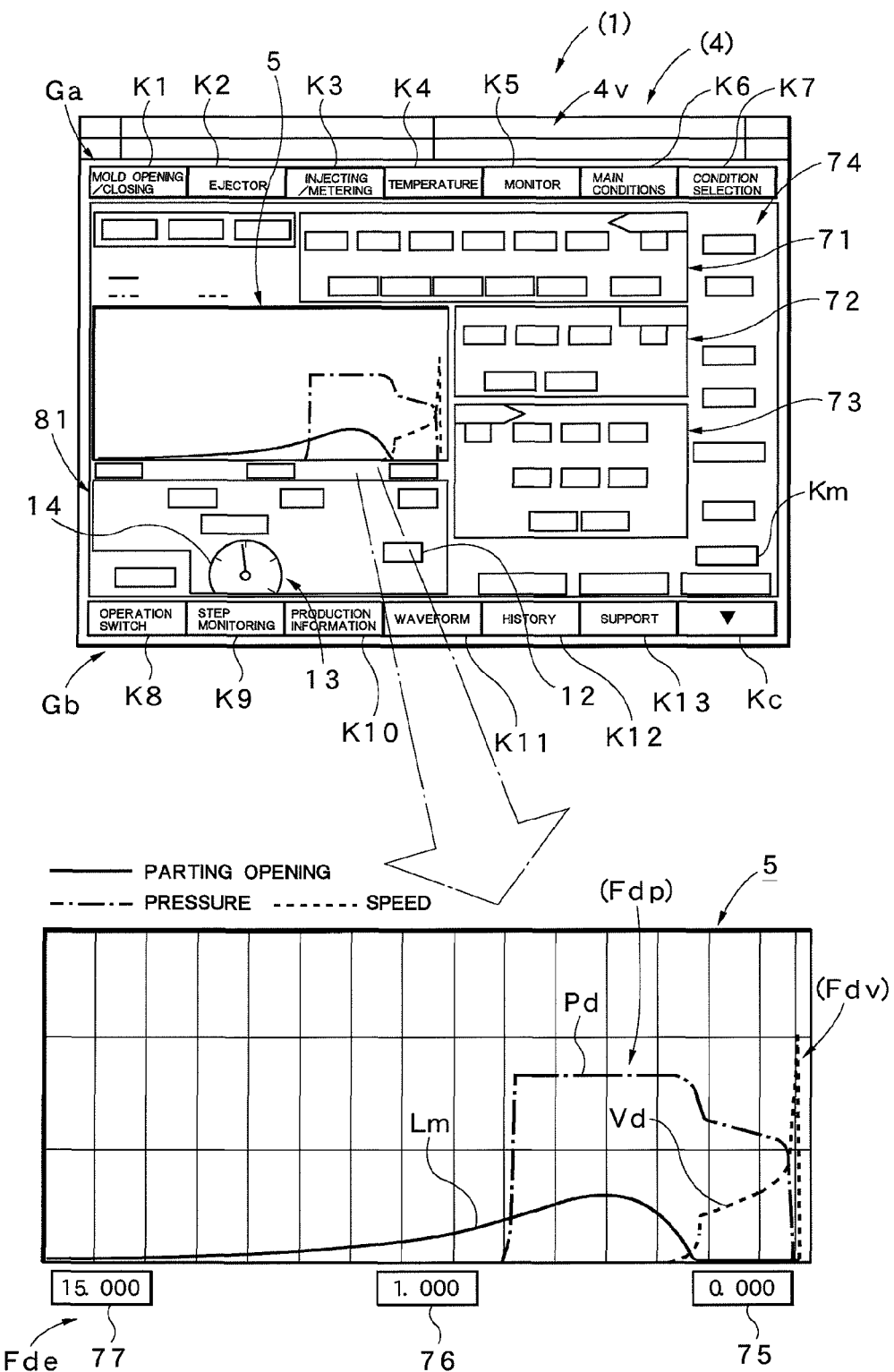
FIG. 1 is a view of a display screen on a waveform monitor apparatus according a best mode embodiment of the present invention and an extracted enlarged diagram of a waveform displaying portion.

Further, the injecting and metering screen 4v is provided with a molding mode selector key Km, where switching between the above-described specific molding mode and the general-purpose molding mode can be performed by an operator's touch on the molding mode selector key Km. As shown in FIG. 1, the injecting and metering screen 4v is provided with an injection speed setting portion 71 for performing setting relating to the injection speed, an injection pressure setting portion 72 for performing setting relating to the injection pressure, a metering setting portion 73 for performing setting relating to the metering, and an auxiliary setting portion 74 for performing the other setting and displaying. In this case, the respective setting portions 71, 72, 73 and 74 are used in both the specific molding mode and the general-purpose molding mode.

Further, the injecting and metering screen 4v is provided with a waveform displaying portion 5 which displays at least change data from the resin filling start ts into the mold 2 up to the cooling time termination te of the mold 2, detected by the parting opening detecting means Fp, and the waveform displaying portion 5 constitutes an operation waveform displaying means Fd. In the waveform displaying portion 5, a horizontal axis is a time (second) axis, while a vertical axis indicates the parting opening Lm [mm], the injection pressure pi [MPa], and the injection speed Vi [mm/s]. In particular, the time [second] on the horizontal axis secures a time length allowing plotting at least ranging from the resin filling start ts into the mold 2 up to the cooling time termination te of the mold 2. Therefore, three time setting portions 75, 76 and 77 are provided at the bottom of the waveform displaying portion 5. The reference sign 75 denotes a start time setting portion for setting a waveform display start time from the injection start, where when, for example, 0.000 second is set, the waveform is displayed from the injection start time (0.000 second). The reference sign 76 denotes a scale time setting portion for setting a waveform time axis scale interval, where, when, for example, 1.000 is set, one scale is set to 1.000 second. The reference sign 77 denotes a whole display time setting portion for setting a waveform display termination time from the injection start, where, when, for example, 15.000 seconds is set, the waveform is displayed for 15.000 seconds from the injection start time. On the other hand, the parting opening Lm [mm], the injection pressure Pi [MPa] and the injection speed Vi [mm/s] corresponding to the vertical axis can be set from the waveform screen displayed by touch to the waveform screen selector switch K11.

Now, three respective time setting portions 75, 76 and 77 constitute a partially-enlarging displaying function Fde which can designate any partial section on the time axis (the horizontal axis) on the waveform displaying portion 5 to display the section in an enlarged fashion. That is, any section of the waveform can be displayed in an enlarged fashion by designating a partial section by using the start time setting portion 75 and the whole display time setting portion 77, and further designating the scale time by the scale time setting portion 76. Therefore, when such a partially-enlarging displaying function Fde is provided, any partial section of the waveform can be displayed in an enlarge fashion. As a result, such a merit can be obtained that an important portion can be confirmed more precisely by displaying the vicinity of a portion of the waveform where the parting opening mount Lm becomes maximum and condition setting (change) relating to the injection and condition setting (change) relating to the mold clamping force can be performed easily.

The waveform displaying portion 5 is used only for the specific molding mode. Therefore, in the case of the general-purpose molding mode, displaying different from that on the waveform displaying portion 5, namely, a general waveform displaying which is known conventionally is performed. For example, waveform displaying such as disclosed in Patent Literature 1 and Patent Literature 2 is performed. Thus, when switching between the specific molding mode and the general-purpose molding mode can be performed and the waveform displaying portion 5 (operation waveform displaying means Fd) can be used only when switching to the specific molding mode has been performed, optimization to the specific molding mode is made possible without sacrificing the general-purpose molding mode. As a result, selection from molding systems conforming with various molding scenes different in molded product, molding material or the like is made possible, thereby multi-functionality and further commodity value and merchantability of the injection molding machine M are enhanced, and usability on a user side can be further enhanced.

Further, the operation waveform displaying means Fd is provided with a superimposition displaying function Fdp which superimposes the change data of the injection pressure Pd to a time during molding on the change data of the parting opening Lm to perform displaying on the waveform displaying portion 5, as shown in FIG. 1. As the change data of the injection pressure Pd, detection data of the pressure sensor 16 can be utilized. When such a superimposition displaying function Fdp is provided, the change of the parting opening Lm to a time can be grasped in contrast with the change of the injection pressure Pi to a time, so that such a merit can be obtained that more precise monitoring can be performed regarding the change data of the parting opening Lm and fine adjustment or the like for optimizing the molding condition can be performed easily. Further, the operation waveform displaying means Fd is provided with the superimposition displaying function Fdv which superimposes the change data of the injection speed Vd to time during molding on the change data of the parting opening Lm to perform displaying on the waveform displaying portion 5, as shown in FIG. 1. As the change data of the injection speed Vd, an output result of a speed converting portion 61 shown in FIG. 5 can be utilized. When such an superimposition displaying function Fdv is provided, the change of the parting opening Lm to a time can be grasped in contrast with the change of the injection speed Vd to a time, so that such a merit can be obtained that more precise monitoring can be performed regarding the change data of the parting opening Lm and fine adjustment or the like for optimizing the molding condition can be performed easily.

Figure 2:
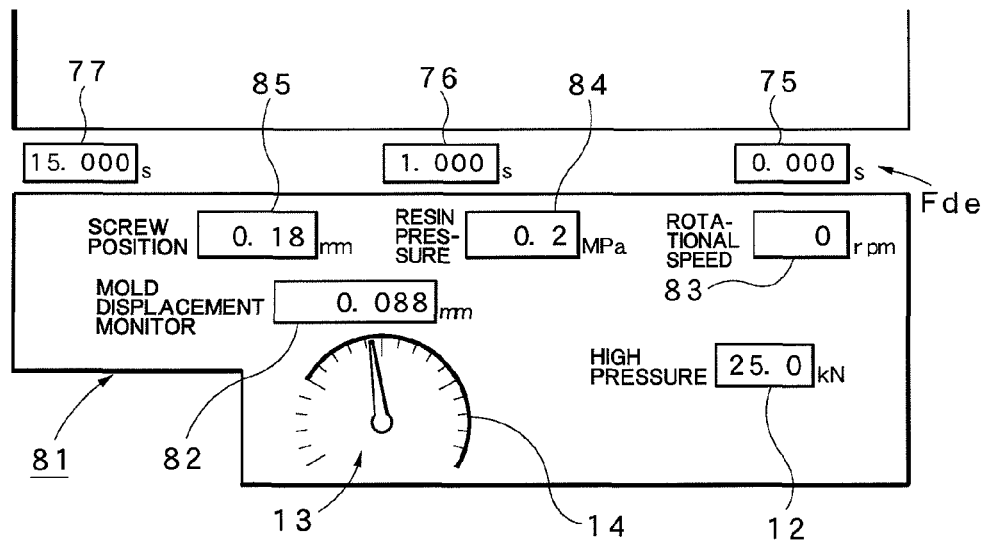
FIG. 2 is a partially extracted enlarged view of a display screen of the waveform monitor apparatus, including a mold clamping force setting portion and an analog displaying portion.
Figure 3:
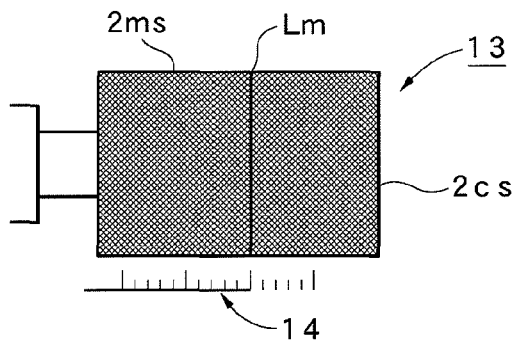
FIG. 3(a) is a screen displaying diagram showing a case where a parting opening is 0 in a modified embodiment of the analog displaying portion.
FIG. 3(b) is a screen displaying diagram showing a case where the parting opening has become large in the modified embodiment of the analog displaying portion.
Figure 3:
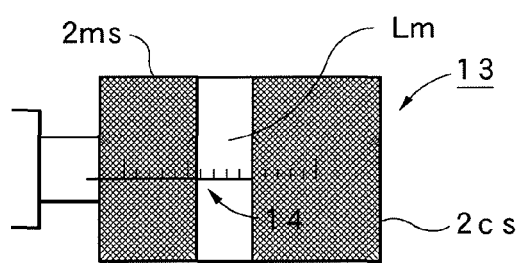

On the other hand, as shown in FIG. 1, a specific molding setting portion 81 is provided below and adjacent to the waveform displaying portion 5. The specific molding setting portion 81 is used in the specific molding mode. The specific molding setting portion 81 also constitutes a portion of the operation waveform displaying means Fd. FIG. 2 shows the extracted specific molding setting portion 81 in an enlarged fashion. The specific molding setting portion 81 is provided with a mold clamping force setting portion 12 and an analog displaying portion 13. The mold clamping force setting portion 12 is provided with a function of setting a mold clamping force Pc [tonf], and is disposed below and adjacent to the waveform displaying portion 5. When the mold clamping force setting portion 12 positioned adjacent to the waveform displaying portion 5 is provided in this manner, setting can be made using the mold clamping force setting portion 12 while the waveform (change) of the parting opening Lm displayed on the waveform displaying portion 5 is being confirmed, so that setting of the mold clamping force Pc which greatly affects the change of the parting opening Lm can be easily and more precisely performed.

The analog displaying portion 13 is provided with a function of displaying the parting opening Lm obtained in real time in an analog fashion, and it is disposed below and adjacent to the waveform displaying portion 5. As shown in FIG. 2, the exemplified analog displaying portion 13 is attached with a circular scale 14 for analog displaying and it is depicted to look like a dial gauge which is a precise measuring instrument. Therefore, when such an analog displaying portion 13 is provided, the change state of the parting opening Lm to a time displayed on the waveform displaying portion 5 and the numerical value (size) of the parting opening Lm displayed on the analog displaying portion 13 in real time can be confirmed simultaneously, so that such a merit can be obtained that optimal monitoring of the parting opening Lm can be realized according to a synergistic effect based on both the change condition and the numerical value.

In addition, reference sign 82 shown in the specific molding setting portion 81 denotes a mold displacement monitor, which has a function of displaying the absolute value of the parting opening Lm displayed on the analog displaying portion 13 as a numerical value. Reference sign 83 denotes a rotational speed displaying portion, 84 denotes a resin pressure displaying portion, and 85 denotes a screw position displaying portion. Incidentally, FIGS. 3(a) and 3(b) show a modified example of the analog displaying portion 13. The analog displaying portion 13 shown in FIGS. 3(a) and 3(b) is displayed to look like the shape of the mold 2, where a fixed mold displaying portion 2cs and a movable mold displaying portion 2ms are used. FIG. 3(a) shows a case where the parting opening Lm is 0 and FIG. 3(b) shows a case where the parting opening Lm has become large. Reference sign 14 is a scale corresponding to the parting opening Lm. When such an analog displaying portion 13 as shown in FIGS. 3(a) and 3(b) is used, the size of the parting opening Lm can be grasped more intuitively. Thus, the analog displaying portion 13 can be displayed in various forms (aspects).

On the other hand, the servo amplifier 52 is provided with a pressure compensation portion 56, a speed limiter 57, a rotational speed compensation portion 58, a torque compensation portion 59, a current detecting portion 60, and a speed converting portion 61. A molding injection pressure Pi (limit pressure Ps) or a molding mold clamping force Pc is inputted from the controller main body 51 into the pressure compensation portion 56 and a speed limit value VL is inputted into the speed limiter 57. Thereby, a pressure-compensated speed instruction value is outputted from the pressure compensation portion 56 and is inputted into the speed limiter 57. The speed instruction value is limited by the limit pressure Ps and the speed instruction value outputted from the speed limiter 57 is limited by the speed limit value VL. Further, the speed instruction value outputted from the speed limiter 57 is inputted into the rotational speed compensation portion 58, and a torque instruction value outputted from the rotational speed compensation portion 58 is inputted into the torque compensation portion 59. Then, a motor driving current outputted from the torque compensation portion 59 is supplied to the servo motor 39 and the servo motor 39 is driven. An encoder pulse obtained from the rotary encoder 40 is converted to a speed detection value (Vd) by the speed converting portion 61, the speed detection value (Vd) is inputted into the controller main body 51, and it is inputted into the rotational speed compensation portion 58, so that feedback control of a minor loop is performed to the rotational speed.

Next, a molding method performed by the injection molding machine M including a function of the waveform monitor apparatus 1 according to this embodiment will be described specifically with reference to FIG. 1 to FIGS. 10(a), 10(b) and FIG. 10(c).

First, the outline of the molding method is as follows:

(A) A molding mold clamping force Pc and a molding injection pressure Pi used during production are obtained and they are set as molding conditions in advance. At this time, the following conditions are satisfied:

(x) a proper parting opening (natural clearance) Lm occurs between the fixed mold 2c and the movable mold 2m at an injecting and filling time, and (y) molding failure such as burr, shrinking, and warpage does not occur in a molded product G.

Further, considering degassing and compression (natural compression) of resin R and also considering a molding clearance Lmp which is a parting opening at the maximum time and a residual clearance Lmr which is a parting opening after elapsing of the cooling time Tc, the natural clearance Lm satisfies respective allowable ranges of (xa) the molding clearance Lmp is in a range of 0.03 to 0.30 [mm], and (xb) the residual clearance Lmr is in a range of 0.01 to 0.10 [mm] as conditions.

(B) Resin R is simply injected according to the molding condition that mold clamping is performed by a set mold clamping force Pc and the condition that the molding injection pressure Pi is set to the limit pressure.

Therefore, according to such a molding method, the natural clearance Lm and the natural compression occur in the mold 2 at the injecting and filling time. As a result, even if behavior of the resin R injected and filled by the injection apparatus Mi is unstable, the mold clamping apparatus Mc adapts to the unstable behavior of the resin R so that a molded product G having high levels of quality and homogeneity can be obtained.

Figure 6:
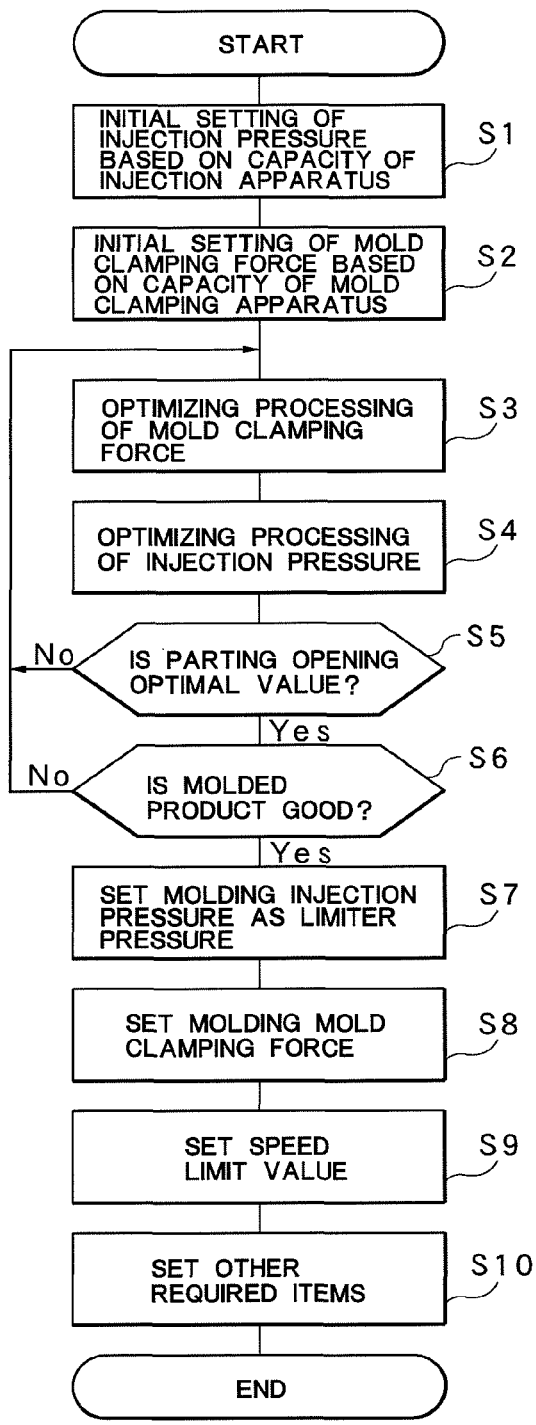
FIG. 6 is a flowchart for explaining a process procedure at a setting time of molding conditions in the injection molding machine.

Next, a specific processing procedure will be described. First, the molding injection pressure Pi and the molding mod clamping force Pc constituting the molding conditions are obtained and the molding conditions are set. FIG. 6 shows a flowchart for explaining a processing procedure for obtaining and setting the molding injection pressure Pi and the molding mold clamping force Pc.

First, the molding mode is switched to the specific molding mode by the molding mode selector key Km. Then, the injection pressure constituting the injection condition on the side of the injection apparatus Mi is initially set by the injection pressure setting portion 72. As the injection pressure at this time, an injection pressure based on the capacity (driving force) of the injection apparatus Mi can be set (step S1). In this case, the injection pressure can be obtained from hydraulic pressure Po detected by the pressure sensor 16 in the hydraulic circuit 35 connected to the injection cylinder 24. Since the injection pressure is not required accurately as an absolute value, the magnitude of the detected hydraulic pressure Po may be used or it may be converted to an injection pressure according to calculation to be used. Further, the mold clamping force constituting the mold clamping condition on the side of the mold clamping apparatus Mc is initially set by the mold clamping force setting portion 12. As the mold clamping force at this time, a mold clamping force based on the capacity (driving force) of the mold clamping apparatus Mc can be set (step S2). In this case, the mold clamping force can be obtained from the hydraulic pressure Po detected by the pressure sensor 16 in the hydraulic circuit 35 connected to the mold clamping cylinder 27. Since the mold clamping force does not need to be accurately obtained as an absolute value, the magnitude of the detected hydraulic pressure Po may be used or it may be converted to the mold clamping force according to calculation to be used. Incidentally, the hydraulic circuit 35 is subjected to switching operation by the valve circuit 37 to function as a hydraulic circuit on the side of the mold clamping apparatus Mc at a mold clamping time and function as a hydraulic circuit on the side of the injection apparatus Mi at an injection time. When such a hydraulic pressure Po is used as the injection pressure and the mold clamping pressure, setting relating to the mold clamping force Pc and the mold injection pressure Pi can be made easily. In addition, since setting of accurate mold clamping force Pc and mold injection pressure Pi as absolute values are not required, operation control with high precision and with reduced error factor can be performed.

Figures 8, 9:
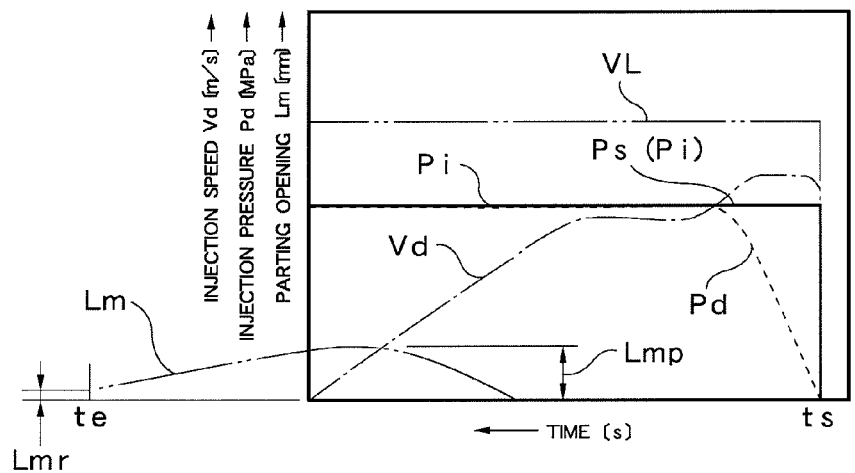
FIG. 8 is a data table showing an evaluation result of a molded product to a mold clamping force, for explaining processing at a setting time of the injection molding machine.
FIG. 9 is a change characteristic graph of an injection pressure, an injection speed and an inter-mold clearance to a time during production in the injection molding machine.

Next, the mold clamping force Pc used during production is obtained by performing optimizing processing to the initially set mold clamping force and the molding injection pressure Pi used during production is obtained by performing optimizing processing to the initially set injection pressure (steps S3 and S4). One example of a method for optimizing the mold clamping force and the injection pressure will be described with reference to FIG. 8. In the exemplified case, the initially set mold clamping force is 40 [kN]. In the result which was obtained by performing trial molding using the initially set mold clamping force and injection pressure, both the molding clearance Lmp and the residual clearance Lmr were 0, as shown in FIG. 8. That is, since the mold clamping force was large, burr did not occur (◎) but shrinkage, warpage and degassing were bad (▲ ▲ ▲), respectively.

Therefore, the parting opening Lm (Lmp, Lmr) between the fixed mold 2c and the movable mold 2m is measured by lowering the magnitude of the mold clamping force and the magnitude of the injection pressure in a stepwise fashion, as shown in FIG. 8, and performing trial moldings in the respective steps, then, quality of molded products G are evaluated (steps S5 and S6). FIG. 8 shows the result of the trial moldings.

Incidentally, data of the injection pressure is not shown in FIG. 8, but the optimization of the injection pressure can utilize a settable minimum value or a value in the vicinity thereof as the molding injection pressure Pi under the condition that the parting opening Lm occurs between the movable mold 2m and the fixed mold 2c at the injecting and filling time and a good product can be molded. Therefore, specifically, as shown in FIG. 8, when the mold clamping force is changed (lowered), the injection pressure is also changed (lowered) so that magnitude just before the resin R cannot be normally filled into the mold 2 can be selected as the molding injection pressure Pi. When such a minimum value or the value in the vicinity thereof is selected as the mold injection pressure Pi, the mold clamping force Pc also becomes settable to the minimum value thereof or a value in the vicinity thereof according to the selection, so that an optimal performance can be obtained in view of enhancement of energy saving, and protection and long service life of mechanisms, parts and the like can be achieved. The molding injection pressure Pi obtained is set as the limiter pressure Ps to the injection pressure during production (step S7).

On the other hand, in the respective steps shown in FIG. 8, both the molding clearances Lmp and the residual clearances Lmr satisfy the allowable ranges when the mold clamping forces are 14, 15 and 16 [kN] surrounded by a virtual line frame Zu. That is, the molding clearances Lmp satisfy the allowable range of 0.03 to 0.30 [mm], and they further satisfy the allowable range of 0.03 to 0.20 [mm]. Further, the residual clearances Lmr satisfy the allowable range of 0.01 to 0.10 [mm], and they further satisfy the allowable range of 0.01 to 0.04 [mm] In addition, none of burr, shrinkage and warpage occur (◎) and degassing is well performed (◎), which results in satisfaction of the condition that a good molded product is obtained. Therefore, the molding mold clamping force Pc can be selected from three mold clamping forces 14, 15 and 16 [kN] to be set. The selected mold clamping force is set as the molding mold clamping force Pc when mold clamping is performed during production (step S8).

Incidentally, in the case shown in FIG. 8, when the molding clearance Lmp satisfies the allowable range of 0.03 to 0.20 [mm] and the residual clearance Lmr satisfies the allowable range of 0.01 to 0.04 [mm], a best molded product where no burr occurs can be obtained. However, since a burr can be removed after taking out a mold product and there is such a case that a molded product having few burrs can be handled as a good product, a low-level burr occurrence indicated by symbols (○) and (Δ) does not immediately mean that it is a bad product. Therefore, when the result shown in FIG. 8 is considered, selection of either of the mold clamping forces of 12 and 13 [kN] surrounded by a virtual line frame Zus is possible according to kind of a molded product G or the like. That is, when the molding clearance Lmp satisfies the allowable range of 0.03 to 0.30 [mm] and the residual clearance Lmr satisfies the allowable range of 0.01 to 0.10 [mm], a good molded product can be obtained.

FIG. 8 is experimental data for explaining the setting methods of the molding mold clamping force Pc and the mold injection pressure Pi. Therefore, when setting is actually performed, a targeted molding mold clamping force Pc and mold injection pressure Pi can be obtained by performing trial moldings several times with the mold clamping forces of 40, 30, 20, 10 and the like, for example. The magnitudes of the mold clamping force and the injection pressure may be set arbitrarily by an operator, or they may be automatically or manually obtained while also utilizing an auto-tuning function or the like provided in the injection molding machine M. When the auto-tuning function is utilized, the mold clamping force just before a burr occurs can be obtained easily.

On the other hand, the speed limit value VL to the injection speed Vd of the injection molding machine Mi is set (step S9). The speed limit value VL is not necessarily set, but if it is set, mechanical protection of the mold 2, the screw 22, or the like can be achieved even if the injection speed Vd becomes excessively fast. Therefore, the speed which can achieve the mechanical protection of the mold 2, the screw 22, or the like is set as the speed limit value VL.

Further, setting of other required items is performed (step S10). The exemplified injection molding machine M is provided with a correction function of correcting the molding mold clamping force Pc according to the level of the oil temperature To detected by the temperature sensor 17 in the hydraulic circuit 35. The correction function is a function for excluding influence of the oil temperature To to the molding mold clamping force Pc due to temperature drift or the like. Since the molding mold clamping force Pc is always kept constant by this function, further high precision and stability of operation control can be achieved and can contribute to high-level quality and homogeneity of a molded product G. Accordingly, for setting the other required items, a correction coefficient used when correction is made by the correction function or the like can be applied.

Figure 7:
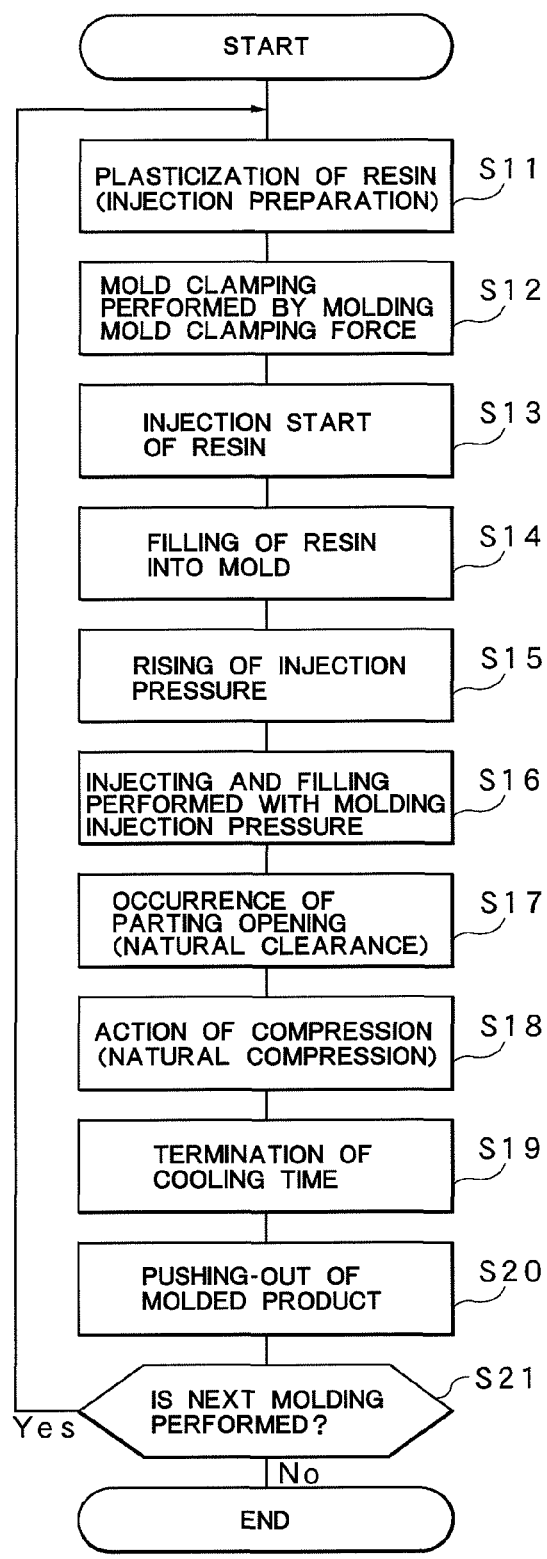
FIG. 7 is a flowchart for explaining a process procedure of the injection molding machine during production.

Next, a specific processing procedure during production will be described. FIG. 7 shows a flowchart for explaining a processing procedure during production using the mold injection pressure Pi and the molding mold clamping force Pc.

First, the metering motor 25 in the injection apparatus Mi is driven according to switching of the valve circuit 37 and control of the servo motor 39, so that injection preparation is performed by plasticizing the resin R (step S11). In the molding method, a metering step of metering resin R accurately is not required unlike a general molding method. That is, a metering operation is performed at a general metering step, but metering control for obtaining an accurate metering value is not preformed. Such an operation that resin R is added before resin R becomes deficient is performed. Further, the mold clamping cylinder 27 in the mold clamping apparatus Mc is driven according to switching of the valve circuit 37 and control of the servo motor 39 and mold clamping is performed to the mold 2 such that the mold clamping force reaches the molding mold clamping force Pc (step S12). The state of the mold 2 at this time is shown in FIG. 10(a).

Next, the injection cylinder 24 in the injection apparatus Mi is driven according to switching of the valve circuit 37 and control of the servo motor 39, so that injection of resin R is performed from the injection starting point is shown in FIG. 9 (step S13). In this case, the screw 22 may be advanced according to a rated operation, and speed control and pressure control to the screw 22 are not required. Accordingly, plasticized and molten resin R in the heating cylinder 21 is filled into the cavity in the mold 2 (step S14). As shown in FIG. 9, the injection pressure Pd rises according to filling of the resin R. Then, the injection pressure Pd comes close to the limit pressure Ps, and when it reaches the limit pressure Ps, control for maintaining the limit pressure Ps, namely, control for preventing overshoot is performed, so that the injection pressure Pd is maintained at the limit pressure Ps (molding injection pressure Pi) (steps S15 and S16). Therefore, substantial one pressure control is performed in the injection operation. Incidentally, reference sign Vd in FIG. 9 denotes an injection speed.

Further, the resin R is filled in the cavity in the mold 2, so that the mold 2 is pressurized by the resin R, which results in occurrence of the molding clearance Lm between the fixed mold 2c and the movable mold 2m and results in occurrence of the molding clearance Lmp at the maximum time (step S17). The molding clearance Lmp falls within the allowable range of 0.03 to 0.30 [mm], preferably falls within the allowable range of 0.03 to 0.20 [mm], according to preset molding mold clamping force Pc and molding injection pressure Pi, so that excellent degassing is performed and molding of a good product where defect has been excluded is performed. The state of the mold 2 at this time is shown in FIG. 10(b). On the other hand, solidification of the resin R in the cavity in the mold 2 progresses according to time elapsing and compression (natural compression) of the resin R occurs according to the solidification (step S18).

Then, when the set cooling time Tc elapses, the mold clamping cylinder 27 is driven according to switching of the valve circuit 37 and control of the servo motor 39 to retreat the movable mold 2, thereby opening the mold, while the pushing-out cylinder 31 is driven according to switching of the valve circuit 37 and control of the servo motor 39 to push out a molded product G which has adhered to the movable mold 2m (steps S19 and S20). Accordingly, the molded product G is taken out so that one molding cycle is terminated. Incidentally, the cooling time Tc can be set as an elapsing time from the injection starting time is in advance. Further, as shown in FIG. 9, at a time point to at which the cooling time Tc has elapsed, according to the natural compression of the resin R, the residual clearance Lmr between the fixed mold 2c and the movable mold 2m falls within the allowable range of 0.01 to 0.10 [mm], preferably, falls within the allowable range of 0.01 to 0.04 [mm] according to the preset molding mold clamping force Pc and the molding injection pressure Pi, so that the natural compression to the resin R in the cavity in the mold 2 occurs reliably, and high-level quality and homogeneity of the molded product G are secured. The state of the mold 2 at this time is shown in FIG. 10(c).

Thereafter, when the next molding continues, resin R is plasticized to perform injection preparation and processing such as mold clamping, injection, cooling and the like may be performed similarly to the above (steps S21, S11, S12 . . . ).

Therefore, according to the molding method according to such a specific molding system (specific molding mode), a predetermined molding clearance Lm occurs between the movable mold 2m and the fixed mold 2c in advance and the molding injection pressure Pi and the molding mold clamping force Pc which can mold a good product are obtained to be set at an injecting and filling time in advance, while the mold clamping apparatus Mc is mold-clamped by the molding mold clamping force Pc and the molding injection pressure Pi is set as the limit pressure Ps, and the injection apparatus Mi is driven to inject and fill resin R into the mold 2 during production, so that the set molding injection pressure Pi can be always applied to the resin R which has been filled into the mold 2. As a result, a predetermined molding clearance Lm can be caused to occur due to a relative force relationship between the fixed molding mold clamping force Pc and the fixed molding injection force Pi, and the natural compression can be caused to occur due to the molding mold clamping force Pc even after the injecting and filling of the resin R is terminated, so that high levels of quality and homogeneity can be secured in a molded product G. Therefore, the specific molding system is optimal to molding of resin R with a low viscosity having such a property that the resin R is sensitive to a temperature, a pressure or the like to be affected thereby. In particular, since the hydraulic type mold clamping apparatus of a direct pressure system which displaces the movable mold 2m by the driving ram 27r of the mold clamping cylinder 27 is used as the mold clamping apparatus Mc, the natural compression to the resin R in the mold 2 can be caused by directly utilizing the hydraulic behavior in the mold clamping apparatus Mc itself, which can result in secure realization of excellent natural compression and can also contribute to facilitation of control.

Further, according to this molding method, since it is only necessary to set the molding injection pressure Pi and the molding mold clamping force Pc, it becomes unnecessary to set various molding conditions including not only the injection conditions whose accuracies are required, such as the injection speed, the speed switching position, the injection pressure, and the pressure-holding force, which are mutually affected to one another but also the metering conditions such as a metered value requiring accurate metering. Therefore, simplification and setting facilitation of the molding conditions, and facilitation of quality control can be achieved and operation control during production can be performed easily. In addition, shortening of the molding cycle time by elimination of a series of controls such as multi-stage control to the injection speed, the control to pressure holding, and the like can be achieved, and mass productivity and economic efficiency can be enhanced.

On the other hand, monitoring is performed by the waveform monitor apparatus 1 according to this embodiment during molding. The function of the waveform monitor apparatus 1 will be described below.

The waveform monitor apparatus 1 is used for monitoring of the parting opening Lm which is an important monitoring factor in the above-described specific molding system (specific molding mode). Therefore, change data of the parting opening Lm is detected by the parting opening detecting means Fp during molding, namely, at least a time period from the resin filling start ts into the mold 2 to the cooling time termination te of the mold 2. Specifically, the size (change data) of the parting opening Lm to a time is detected at fixed sampling time intervals using the position detector 11 which detects a relative position between the movable mold 2m and the fixed mold 2c. Accordingly, the detected change data of the parting opening Lm is inputted into the controller main body 51.

On the other hand, the injecting and metering screen 4v is displayed on the display 4, and the change data of the parting opening Lm can be displayed anytime on the waveform displaying portion 5 having a time axis on a horizontal line according to progress of the molding step. In this case, the time axis of the horizontal axis secures at least a time period from the resin filling start ts into the mold 2 to the cooling time termination te of the mold 2. Thereby, an operator can monitor the wave change of the parting opening Lm of the mold 2 which is an operation waveform on the side of the mold clamping apparatus Mc by the waveform displaying portion 5. As a result, even in the injection molding machine M performing molding according to the specific molding system, namely, the molding system where the predetermined parting opening Lm occurs between the movable mold 2m and the fixed mold 2c at the injecting and filling time, the molding injection pressure Pi and the molding mold clamping force Pc which can mold a good product are obtained and set, the mold clamping apparatus Mc is mold-clamped by the molding mold clamping force Pc, and the injection apparatus Mi where the molding injection pressure Pi has been set to the limit pressure Ps is driven to inject and fill resin R into the mold 2, the change state of the parting opening Lm of the mold 2 which is an operation waveform on the side of the mold clamping apparatus Mc can be visually monitored easily and effectively. Therefore, even the injection molding apparatus M performing molding according to the specific molding system can perform sufficient monitoring during production, which can realize improvement of molding quality, production yield and the like, and can contribute to general versatility and expandability.

Further, as shown in FIG. 1, by the superimposition displaying function Fdp, the injection pressure Pd to a time, namely, the change data of the injection pressure Pd detected by the pressure sensor 16 is superimposed on the change data of the parting opening Lm to be displayed on the waveform displaying portion 5, and the injection speed Vd to a time, namely, the change data of the injection speed Vd obtained from the speed converting portion 61 is superimposed on the change data of the parting opening Lm to be displayed on the waveform displaying portion 5. Therefore, by such superimposition displaying functions Fdp and Fdv, the change of the parting opening Lm to a time can be grasped in contrast with the changes of the injection pressure Pd and the injection speed Vi to a time, so that more precise monitoring can be performed to the change data of the parting opening Lm.

Further, the parting opening Lm obtained in real time is displayed in an analog fashion on the analog displaying portion 13 positioned below and adjacent to the waveform displaying portion 5. Therefore, the change state of the parting opening Lm to a time displayed on the waveform displaying portion 5 and the numerical value (size) of the real-time parting opening Lm displayed on the analog displaying portion 13 can be simultaneously confirmed, so that an optimal monitoring of the parting opening Lm can be realized according to a synergetic effect based on the both.

Though best mode embodiment has been described, the present invention is not limited to such an embodiment, and regarding configuration, shape, numerical amount, approach, and the like of detailed portions, change, addition, and deletion can be adopted within a scope not departing from the gist of the present invention.

For example, though the reflection type ranging sensor 11s is exemplified as the position detector 11, various sensors which can detect a clearance or the like with high accuracy in a non-contact fashion, such as a proximity sensor can be utilized. Further, though the case where the change data of the injection pressure Pd and the injection speed Vd are superimposed on the change data of the parting opening Lm to be displayed has been shown, various data including the set value data (VL, Ps, Pi) and the like can be displayed in a superimposing manner, and the superimposition display of the injection pressure Pd and the injection speed Vd is not an essential constituent element. Further, the partially-enlarging displaying function Fde may be configured such that a range of the waveform data (Lm) to be enlarged can be displayed in an enlarged manner by touching two points of both sides of the range. On one hand, it is desirable that a predetermined residual clearance Lmr is caused to occur between the movable mold 2m and the fixed mold 2c after elapsing of the cooling time Tc, but a case where the residual clearance Lmr is not caused to occur is not excluded. On the other hand, though the case where the hydraulic type mold clamping apparatus of a direct pressure system is used as the injection molding machine M has been exemplified, a power-operated mold clamping apparatus of a toggle system may be used. In this case, when mold clamping is performed in a non-lockup state of a toggle-link mechanism, natural compression becomes possible even in the mold clamping mechanism Mc of a toggle system where natural compression cannot be realized in an original usage aspect, so that the molding according to the specific molding system (specific molding mode) can be realized in the same manner as the case where the hydraulic type mold clamping apparatus of a direct pressure system is used.

In addition, though the allowable range of 0.03 to 0.30 [mm] is exemplified as the molding clearance Lmp and the allowable range of 0.01 to 0.10 [mm] is exemplified as the residual clearance, the present invention is not limited to these ranges, and the ranges can be changed according to the kind of new resin R or the like. Further, it is desirable that the molding injection pressure Pi is set to the minimum value at which a good product can be molded or a value in the vicinity thereof, but the case where the molding injection pressure Pi takes a value other than such a minimum value or a value in the vicinity thereof is not excluded. Further, the case where the hydraulic pressure Po detected by the pressure sensor 16 in the hydraulic circuit 35 connected to the mold clamping cylinder 27 is used has been shown, but hydraulic pressure in the mold clamping cylinder 27 may be used or pressure in a mechanical portion such as a movable plate (movable mold) may be used.

INDUSTRIAL APPLICABILITY

The waveform monitor apparatus according to the present invention can be utilized in various injection molding machines which inject and fill resin R into the mold 2 which is mold-clamped by the mold clamping apparatus Mc from the injection apparatus Mi to perform molding.

REFERENCE SIGNS LIST

1: waveform monitor apparatus, 2: mold, 2m: movable mold, 2c: fixed mold, 3: molding machine controller, 4: display, 4v: screen, 5: waveform displaying portion, 11: position detector, 12: mold clamping force setting portion, 14: scale, 13: analog displaying portion, M: injection molding machine, Mc: mold clamping apparatus, Mi: injection apparatus, Lm: predetermined clearance (parting opening), Fp: parting opening detecting means, Fd: operation waveform displaying means, Fdp: superimposition displaying function, Fdv: superimposition displaying function, Fde: partially-enlarging displaying portion, Pi: molding injection pressure, Pc: molding mold clamping force, Ps: limit pressure, Pd: injection pressure, ts: resin filling start, te: cooling time termination, R: resin, and Vd: injection speed

CITATION LIST

Patent Literature 1
Japanese Unexamined Patent Application Publication No. 2007-118349
Patent Literature 2
Japanese Unexamined Patent Application Publication No. 2001-260174
Patent Literature 3
Japanese Unexamined Patent Application Publication No. 2004-330479

The invention claimed is:

1. A waveform monitor apparatus of an injection molding machine for monitoring an operation waveform at least during molding, which is mounted on the injection molding machine which performs molding according to a specific molding system where a predetermined clearance (a parting opening) occurs between a movable mold and a fixed mold in a mold at an injecting and filling time and an injection pressure (molding injection pressure) and a mold clamping force (molding mold clamping force) which can mold a good product are obtained and set, a mold clamping apparatus is mold-clamped by the molding mold clamping force, and resin is injected and filled into the mold by driving an injection apparatus where the molding injection pressure has been set as a limit pressure, wherein the waveform monitor apparatus of an injection molding machine comprises a parting opening detecting means for detecting change data of the parting opening to a time during molding, and an operation waveform displaying means for displaying at least change data from resin filling start into the mold to a cooling time termination of the mold detected by the parting opening detecting means on a waveform displaying portion on a screen of a display attached to a molding machine controller.

2. The waveform monitor apparatus of an injection molding machine according to claim 1, wherein a position detector which is attached to the mold to detect a relative position between the movable mold and the fixed mold is used as the parting opening detecting means.

3. The waveform monitor apparatus of an injection molding machine according to claim 2, wherein a sensor which performs detection in a non-contact fashion, including a reflection type ranging sensor or a proximity sensor, is used as the position detector.

4. The waveform monitor apparatus of an injection molding machine according to claim 1, wherein the operation waveform displaying means is provided with a superimposition displaying function which superimposes change data of an injection pressure to a time during molding on change data of the parting opening to perform displaying on the waveform displaying portion.

5. The waveform monitor apparatus of an injection molding machine according to claim 1, wherein the operation waveform displaying means is provided with a superimposition displaying function which superimposes change data of an injection speed to a time during molding on change data of the parting opening to perform displaying on the waveform displaying portion.

6. The waveform monitor apparatus of an injection molding machine according to claim 5, wherein the operation waveform displaying means is provided with a superimposition displaying function which superimposes change data of an injection pressure to a time during molding on change data of the parting opening to perform displaying on the waveform displaying portion.

7. The waveform monitor apparatus of an injection molding machine according to claim 1, wherein the operation waveform displaying means is provided with a partially-enlarging displaying function which can designate any partial section on a time axis on the waveform displaying portion to display the same in an enlarged fashion.

8. The waveform monitor apparatus of an injection molding machine according to claim 1, wherein the operation waveform displaying means is provided with a mold clamping force setting portion which is arranged adjacent to the waveform displaying portion and sets at least the mold clamping force.

9. The waveform monitor apparatus of an injection molding machine according to claim 1, wherein the operation waveform displaying means is provided with an analog displaying portion with a scale which is arranged adjacent to the waveform displaying portion and can display the parting opening obtained in real time in an analog fashion.

10. The waveform monitor apparatus of an injection molding machine according to claim 9, wherein the analog displaying portion is displayed so as to look like a dial gauge attached with a circular scale.

11. The waveform monitor apparatus of an injection molding machine according to claim 9, wherein the analog displaying portions displayed so as to look like the shape of the mold composed of a fixed mold displaying portion and a movable mold displaying portion.

12. The waveform monitor apparatus of an injection molding machine according to claim 1, wherein a switchable configuration between the specific molding system and a general-purpose molding system where mold clamping of the mold is performed by a set predetermined mold clamping force and molding is performed by injecting and filling resin into the mold with a set predetermined injection speed and at a set predetermined injection pressure is adopted and the operation waveform displaying means is used only in a switched state to the specific molding system.

13. The waveform monitor apparatus of an injection molding machine according to claim 1, wherein a hydraulic mold clamping apparatus of a direct pressure system is used as the mold clamping apparatus.

14. The waveform monitor apparatus of an injection molding machine according to claim 1, wherein a power-driven mold clamping apparatus of a toggle type which performs mold clamping in a non-lockup state of a toggle link mechanism is used as the mold clamping apparatus.

* * * * *